United States Patent
Katou et al.

(10) Patent No.: US 6,938,323 B2
(45) Date of Patent: Sep. 6, 2005

(54) METHOD OF MANUFACTURING STATOR COIL OF ROTARY ELECTRIC MACHINE

(75) Inventors: Mitsuru Katou, Kariya (JP); Yasunori Kitakado, Kariya (JP); Motohiro Murahashi, Kariya (JP)

(73) Assignee: Denso Corporation, Kariya (JP)

( * ) Notice: Subject to any disclaimer, the term of this patent is extended or adjusted under 35 U.S.C. 154(b) by 142 days.

(21) Appl. No.: 10/323,972

(22) Filed: Dec. 20, 2002

(65) Prior Publication Data

US 2003/0121139 A1 Jul. 3, 2003

(30) Foreign Application Priority Data

Dec. 27, 2001 (JP) ........................................ 2001-397259

(51) Int. Cl.[7] .................... H02K 15/00; H02K 15/14; H02K 15/16
(52) U.S. Cl. ............................. 29/596; 29/597; 29/598; 29/605; 29/732; 310/154.01; 310/156.01; 242/599.1
(58) Field of Search ......................... 29/596, 597, 598, 29/605, 732; 310/154.01, 156.01; 242/599.1

(56) References Cited

U.S. PATENT DOCUMENTS 5,363,546 A * 11/1994 Bradtmueller et al. ..... 29/564.1
6,249,956 B1    6/2001 Maeda et al.
6,490,779 B1 * 12/2002 Tokizawa et al. ............. 29/596
6,557,239 B2 *  5/2003 Takahashi et al. ............ 29/596
2001/0007169 A1  7/2001 Takahashi et al.
2002/0053126 A1  5/2002 Maeda et al.

FOREIGN PATENT DOCUMENTS

DE          40 31 276 A1     4/1992
JP          A 2000-092792    3/2000

* cited by examiner

Primary Examiner—Carl J. Arbes
Assistant Examiner—Tim Phan
(74) Attorney, Agent, or Firm—Oliff & Berridge, PLC (57) ABSTRACT

A stator coil of a rotary electric machine such as an alternator for use in an automobile is composed of a plurality of U-shaped conductor segments inserted into slots formed in a stator core. Each segment has a head portion and two legs extending from the head portion. The plurality of segments include regular segments each having a regular distance between two legs (a regular slot-pitch) and special segments each having a special slot-pitch different from the regular slot-pitch. The head portions of both the regular and the special segments are simultaneously twisted to form the respectively required slot-pitches after a preliminary twist is given to the special segments. In this manner, a process of manufacturing the stator coil is simplified.

2 Claims, 12 Drawing Sheets

FIG. 10A (BEFORE TWIST)

FIG. 10B (AFTER TWIST)

METHOD OF MANUFACTURING STATOR COIL OF ROTARY ELECTRIC MACHINE

CROSS-REFERENCE TO RELATED APPLICATION

This application is based upon and claims benefit of priority of Japanese Patent Application No. 2001-397259 filed on Dec. 27, 2001, the content of which is incorporated herein by reference.

BACKGROUND OF THE INVENTION

1. Field of the Invention

The present invention relates to a method of manufacturing a stator coil of a rotary electric machine such as an alternator for use in an automotive vehicle.

2. Description of Related Art

A method of manufacturing a stator coil for a rotary electric machine is disclosed, for example, in JP-B2-3118837 and JP-B2-3196738. The stator coil disclosed in these patents has a plurality of U-shaped conductor segments inserted into stator slots in its axial direction. Leg-end portions of the U-shaped conductor segments are electrically connected to one another after the segments are inserted into the stator slots, thereby forming a stator coil. The U-shaped conductor segment has a head portion and a pair of legs extending from the head portion. The pair of legs are inserted into a pair of slots positioned one-pole pitch apart from each other, and legs sticking out of the slots are twisted in a circumferential direction and electrically connected to one another thereby forming the stator coil. Thus, a first coil end is formed by the head portions of the U-shaped conductor segments, and a second coil end is formed by the legs sticking out of a stator core and electrically connected to one another.

The stator coil is manufactured in the following steps. Conductor segments, each having a head portion and a pair of legs extending in parallel from the head portion, are formed from a conductor wire having a rectangular cross-section. The pair of legs extend closely to each other at this stage. The closely positioned pair of legs are separated from each other by twisting them with respect to the head portion, so that one leg is inserted into one slot while the other leg is inserted into another slot-which is positioned one-pole pitch (electric angle $\pi$) apart from the one slot. Thus, the U-shaped conductor segments are formed.

Then, the U-shape conductor segments are inserted into respective slots, and the leg portions sticking out of the stator core are bent in a circumferential direction by half a pole-pitch (electric angle $\pi/2$). Then, ends of the legs are electrically connected to one another to form a stator coil as a whole.

Four straight conductor portions of the U-shaped segments may be inserted into one slot as shown in the above patents. In this case, a group of small segments and a group of large segments are formed. The pair of conductor portions of the large segment are positioned at an outer most position in the slot and at an inner most position, while the pair of conductor portions of the small segment are positioned at an inside space between the outer most and the inner most positions.

In some alternators, three compound-phase coils are used to form a three-phase stator coil. For example, it is known to form the three compound-phase coils using six phase coils, U, V, W, X, Y and Z. In this case, U and X phase coils are connected in series forming a U–X compound-phase coil. Similarly, a V–Y compound-phase coil is formed by connecting V and Y phase coils in series, and a W–Z compound-phase coil is formed by connecting W and Z phase coils in series. One pole-pitch (electric angle n) is constituted by six slots, and the six slots are arranged in an order of U, X, -V, Z, W, Y, -U, -X, V, Z, -W and -Y.

A slot pitch between a pair of legs of a U-shaped conductor segment forming an inter-phase connector (e.g., between U and X phases) has to be made different from a slot pitch of other regular U-shaped conductor segments. The same is applied to a U-shaped conductor segment forming an output terminal (e.g., a U–X phase output terminal) and a neutral point connector (e.g., a connector connecting the X-phase to a neutral point of the three-phase winding). For example, if the slot pitch of the regular segment is 6 slots, the slot pitch of the former is 7 slots, and that of the latter is 5 slots. That is, it is required to form regular segments having a regular slot pitch and special segments having a different slot pitch. In other words, an amount of twist given to the head portions of the U-shaped conductor segments has to be changed according to types of the segments. Accordingly, the process for manufacturing the stator coil has not been simple.

SUMMARY OF THE INVENTION

The present invention has been made in view of the above-mentioned problem, and an object of the present invention is to provide an improved and simplified method of manufacturing a stator coil of a rotary electric machine.

A three-phase stator coil such as a stator coil used in a stator of an alternator is composed of a plurality of U-shaped conductor segments inserted into slots of a stator core. Each segment has a head portion and a pair of legs connected to the head portion and extending in parallel to each other. The conductor segments include a group of special segments forming inter-phase connectors, output terminals or neutral point connectors, and a group of regular segments forming other portions of the stator coil.

Before inserting the segments into the stator slots, the head portion of each segment is twisted in a twisting apparatus to position the pair of legs apart from each other by a required slot pitch. The twisting apparatus includes an outer ring and an inner ring, both coaxially coupled to be relatively rotatable. Both rings have the same number of grooves (or holes) as the number of slots formed in the stator core. The grooves are formed in both rings along their circumferential direction.

In order to simultaneously twist both of the regular segments and the special segments in the twisting apparatus, a preliminary twist is given to each of the special segments. For giving the preliminary twist to the special segment, its head portion is twisted by a predetermined slot-pitch (e.g., one slot pitch). The slot-pitch means a distance between both legs of the segment, counted by the number of the stator slots. The preliminary twist is given to the special segment in various ways, though it is preferable to use the above-described twisting apparatus.

In a process of simultaneously twist the head portions of all the segments, one leg of the regular segment is inserted into the groove of the outer ring while the other leg is inserted into the groove of the inner ring which faces the groove of the outer ring into which the one leg is inserted. On the other hand, one leg of the special segment is inserted into the groove of the outer ring while the other leg is inserted into the groove of the inner ring which is positioned at a position shifted by the amount of the preliminary twist (e.g., one slot-pitch).

After inserting all the segments, including the regular segments and the special segments, into the twisting apparatus, the outer ring and the inner ring are relatively rotated by one pole pitch, thereby forming the regular segments twisted by one pole pitch (e.g., 6-slot pitch) and special segments twisted by one pole pitch plus or minus the amount of the preliminary twist (e.g., 5-solot pitch or 7-slot pitch).

Then, all the segments thus twisted are separated from the twisting apparatus and simultaneously inserted into the slots of the stator core without changing relative positions of all the segments. Leg-ends of the segments are bent and electrically connected to one another to form the three-phase stator coil as a whole.

According to the present invention, since the special segments are inserted into the twisting apparatus, after giving them the preliminary twist, together with the regular segments, all the segments can be simultaneously twisted by the same amount, thereby giving respectively required total twists to the regular segments and the special segments. Further, all the segments twisted in the twisting apparatus are inserted together into the slots of the stator core without changing their relative positions. Therefore, the process of manufacturing the stator coil is considerably simplified.

Other objects and features of the present invention will become more readily apparent from a better understanding of the preferred embodiment described below with reference to the following drawings.

DETAILED DESCRIPTION OF THE PREFERRED EMBODIMENT

A preferred embodiment of the present invention will be described with reference to accompanying drawings. First, referring to FIG. 1, an entire structure of an alternator for use in an automotive vehicle will be described. The alternator 1 is composed of a rotor 2, a stator 3, a housing 4, a rectifier 5, an output terminal 6, a rotor shaft 7, brushes 8, slip rings 9 and other associated components. The stator 3 is composed of a stator core 32 having plural slots formed therein and a stator coil 31 disposed in the slots. The stator core 32 is fixedly supported inside the housing 4. The rotor 2 is composed of a pair of rotor cores 71 fixedly connected to the rotor shaft 7 and a field coil 72 wound on the rotor cores 71. The rotor shaft 7 is rotatably supported in the housing 4, and the rotor 2 is disposed inside the stator 3.

Figure 1:
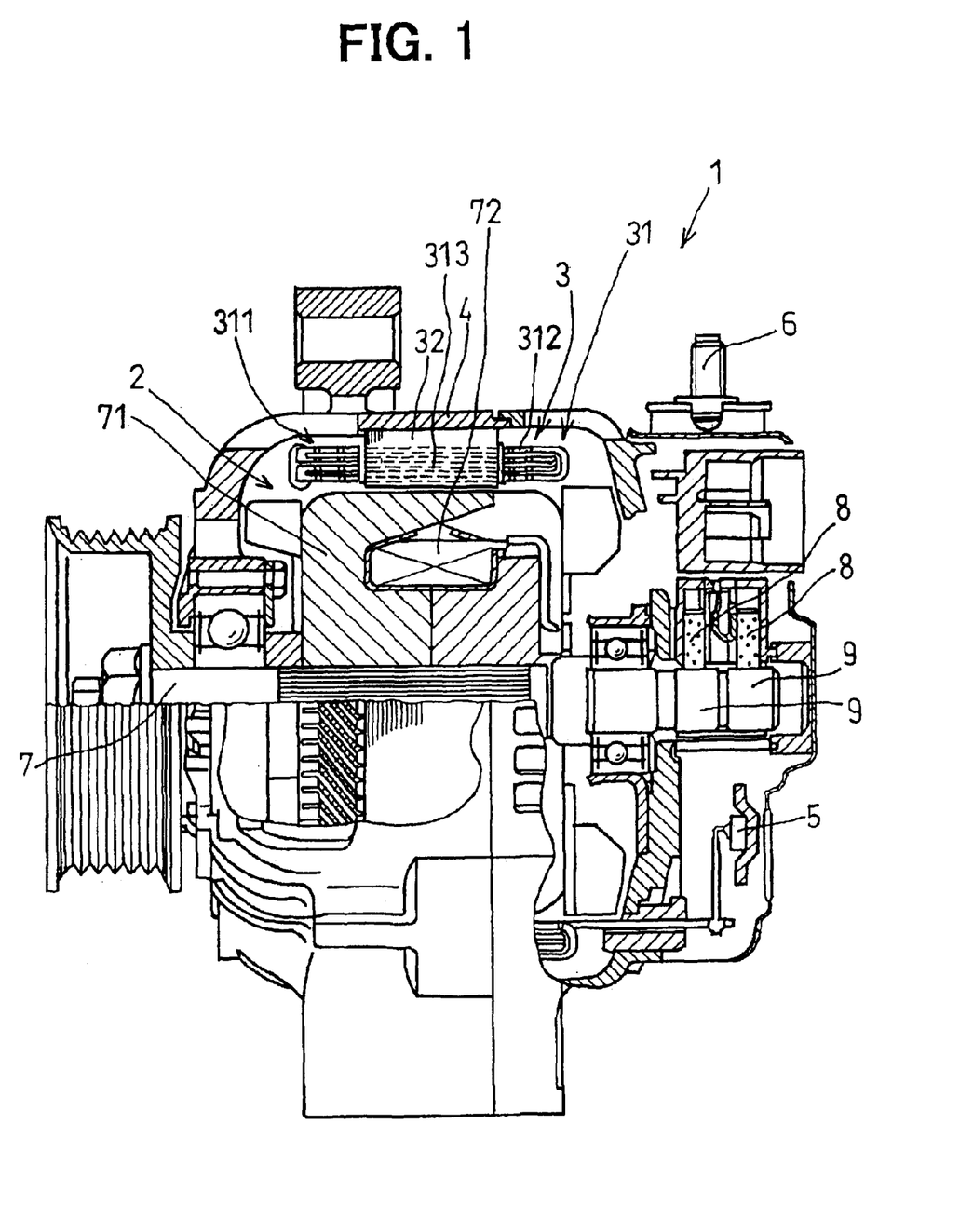
FIG. 1 is a cross-sectional view showing an alternator for use in an automotive vehicle.

The stator coil 31 is a three-phase armature winding having three terminals for outputting three-phase alternating current. The three-phase alternating current is rectified by the rectifier 5 into a direct current which is outputted from the output terminal 6. Field current is supplied to the field coil 72 through the brushes 8 slidably contacting the slip rings 9. An amount of the field current is controlled by a regulator (not shown) to maintain a direct current voltage outputted from the output terminal 6 at a predetermined level. Since the operation of the alternator 1 of this kind is well known, detailed explanation will not be made.

Figure 2:
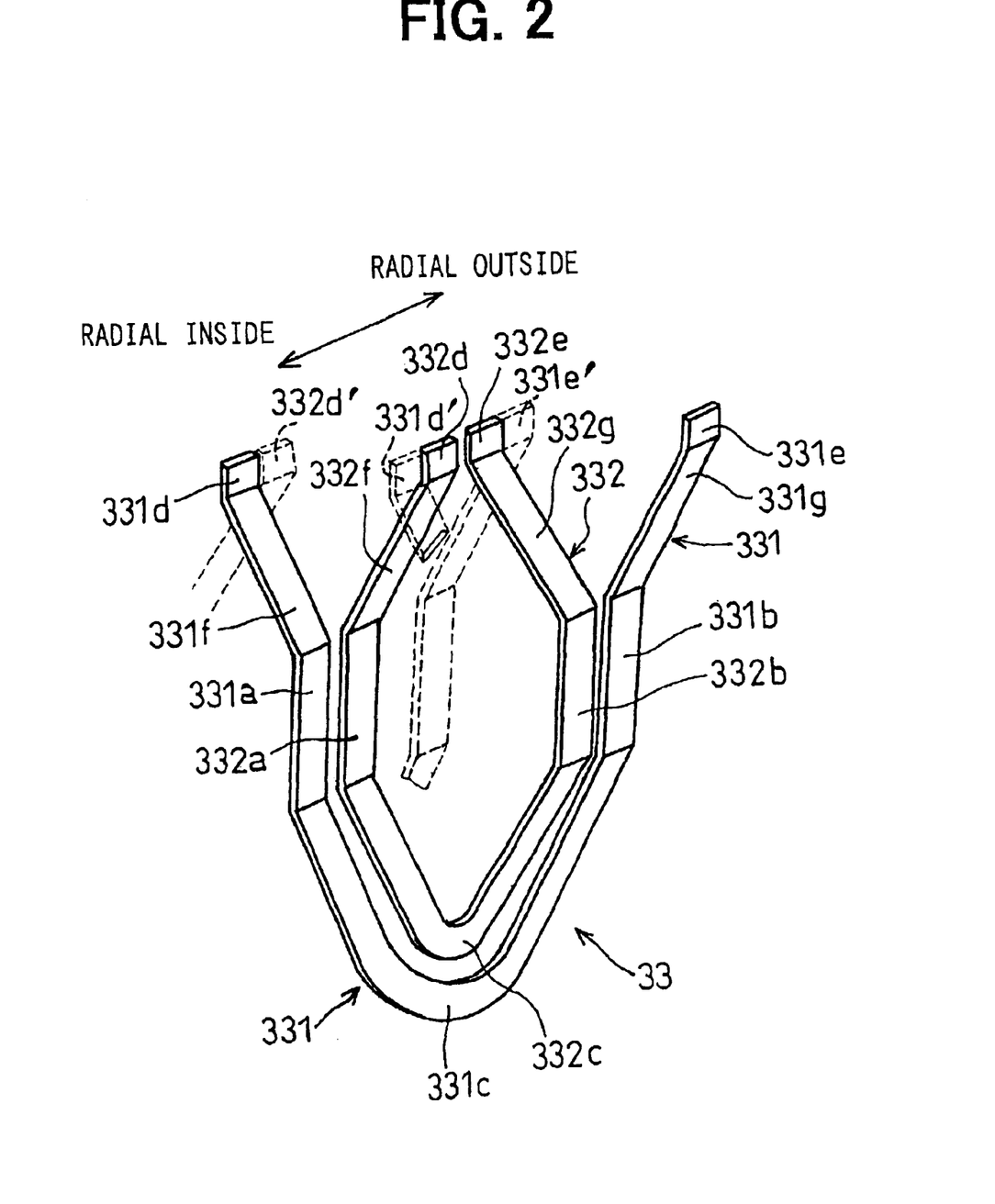
FIG. 2 is a perspective view showing U-shaped segments forming a stator coil.

The stator coil 31 is formed by a plurality of U-shaped conductor segments 33 composed of large segments 331 and small segments 332 (shown in FIG. 2). The U-shaped conductor segments 33 are inserted into slots 35 formed in the stator core 32, and leg portions of the U-shaped conductor segments sticking out of the stator core 32 are electrically connected to form the three-phase armature winding. Each U-shaped conductor segment 33 is formed from a conductor wire having a rectangular cross-section and is covered by an insulating resin film except its connecting ends.

With reference to FIG. 2, the U-shaped conductor segments 33 composed of large segments 331 and small segments 332 will be described in detail. The large segment 331 includes a U-shaped head portion 331c, a pair of in-slot conductors 331a, 331b, a pair of leg-end portions 331f, 331g, and a pair of connecting portions 331d, 331e. Similarly, the small segment 332 includes a U-shaped head portion 332c, a pair of in-slot conductors 332a, 332b, a pair of leg-end portions 332f, 332g, and a pair of connecting ends 332d, 332e. The in-slot conductors 331a, 331b, 332a, 332b of the large and small segments 331, 332 are inserted into the slots 35 of the stator core 32, and other portions are disposed outside the slots 35. The in-slot conductor 331b is positioned at an outer most position in the slot 35, and the in-slot conductor 331a is positioned at an inner most position in the slot 35. The in-slot conductors 332a, 332b are positioned at a middle portion between the outer most and the inner most positions in the slot 35. These positions of the in-slot conductors will be explained later in detail.

The in-slot conductors 331a and 332a are inserted into the same slot, while the in-slot conductors 331b and 332b are inserted in another slot positioned apart from the former slot by a predetermined number of slots (an odd number of slots). In this particular embodiment, the latter slot is positioned apart from the former slot by one pole-pitch (electrical angle π). The head portion 331c of the large segment 331 is disposed to surround an outside of the head portion 332c of the small segment 332. 331d' and 331e' shown in FIG. 2 denote connecting ends of other large segments, and these connecting ends 331d' and 331e' are electrically connected to the connecting ends 332d and 332e of the small segment 332, respectively. Similarly, 332d' denotes a connecting end of another small segment, and the connecting end 332d' is electrically connected to the connecting end 331d of the large segment 331.

Figure 3:
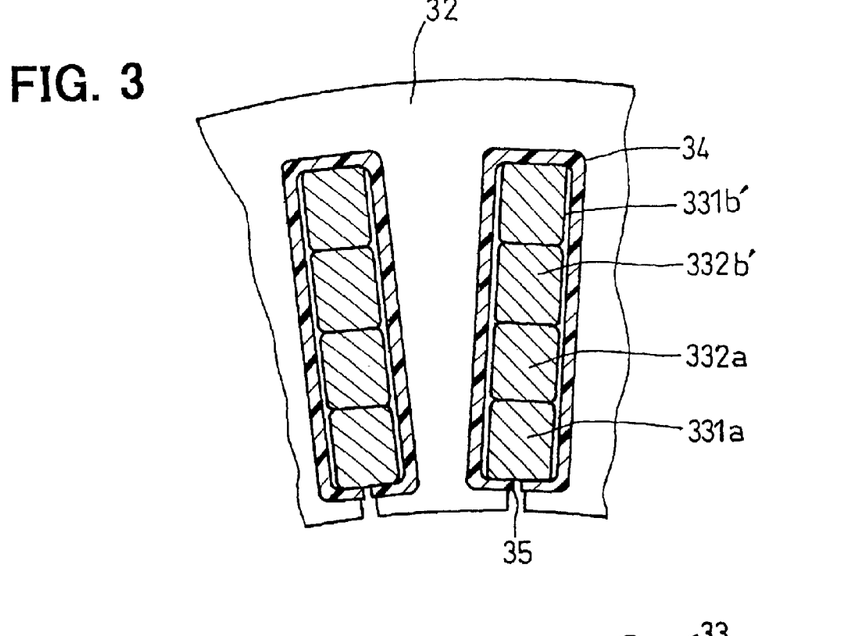
FIG. 3 is a partial cross-sectional view showing a slot of a stator core into which four in-slot conductors of the U-shaped conductor segments are inserted.

As shown in FIG. 3, four in-slot conductors are inserted into the slot 35. The in-slot conductor 331a of the large segment 331 is positioned at a radially inner most position in the slot 35, while another in-slot conductor 331b' of another large segment is positioned at a radially outer most position in the slot 35. The in-slot conductor 332a of the small segment 332 is positioned at a radial outside of the in-slot conductor 331a, while another in-slot conductor 332b' of another small segment is positioned at a radial inside of the in-slot conductor 331b'. In order to simplify explanation of the positions of the in-slot conductors, the positions will be referred to as the first second, third and fourth positions, counting from the radially outer most position in the slot 35. An insulation sheet 34 is disposed in the slot 35 to insulate the in-slot conductors from the stator core 32.

Figure 4:
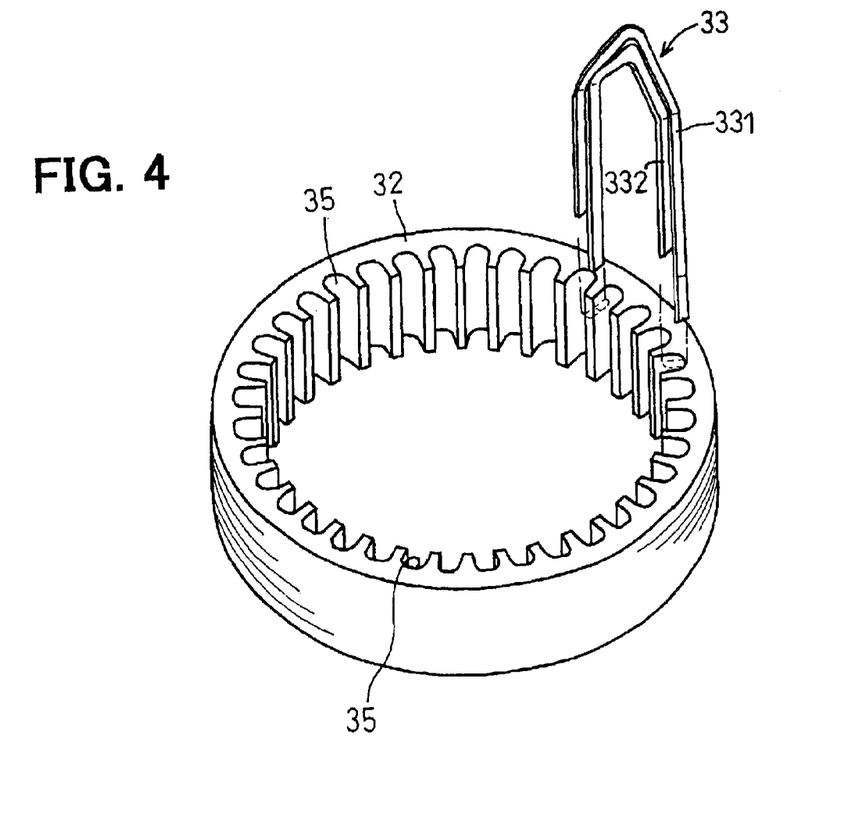
FIG. 4 is a perspective view showing a stator core having slots formed on an inner periphery thereof and U-shaped conductor segments to be inserted into the slots.

FIG. 4 shows an example of positional relation between the slot 35 of the stator core 32 and the U-shaped conductor segments 33 composed of the large segment 331 and the small segment 332. In this example, one pole-pitch is constituted by three slots.

Figure 5:
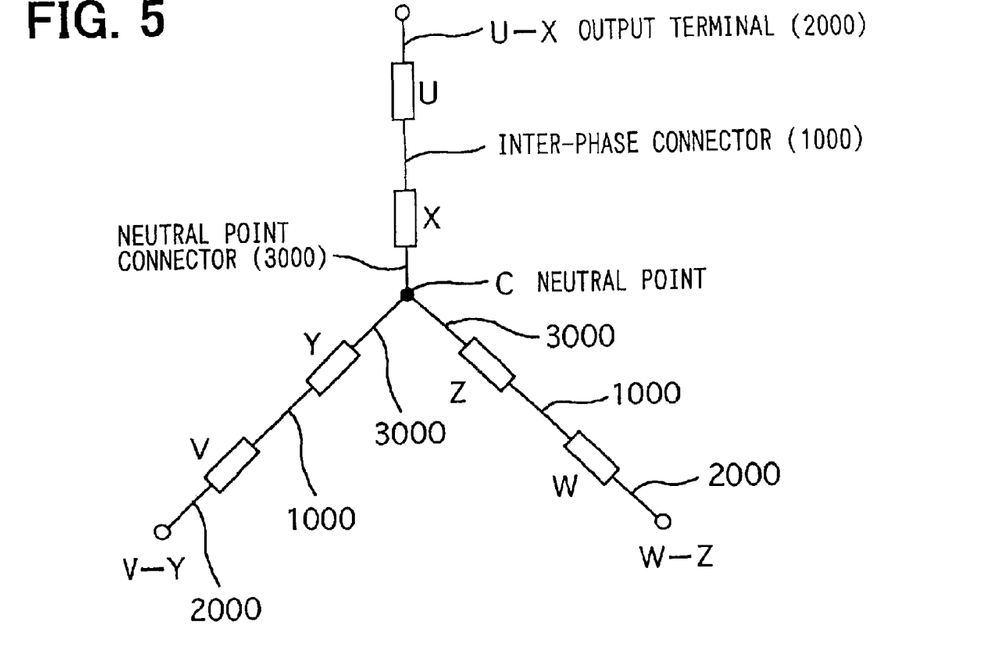
FIG. 5 is a drawing showing a stator coil connected in a star-connection using three compound-phase coils, each compound-phase coil being formed by two phase coils connected in series.

FIG. 5 shows electrical connections of the stator coil 31 connected in a three-phase star connection. A U–X compound-phase is composed of a U-phase coil and an X-phase coil connected in series. Similarly, a V-Y compound-phase is composed of a V-phase coil and a Y-phase coil connected in series, and a W–Z compound-phase is composed of a W-phase coil and a Z-phase coil connected in series. In this example, one pole-pitch (electrical angle π) is constituted by six slots, and the slots are arranged in the following order: U, X, -V, -Z, W, Y, -U, -X, V, Z, -W, and -Y. In this slot arrangement, the U-phase coil and the X-phase coil, positioned next to each other, are connected in series forming an inter-phase connector 1000. One end of this series circuit serves as an output terminal 2000 of the U–X compound-phase, while the other end forms a neutral point connector 3000 which is connected to a neutral point C. Other compound-phases V–Y and W–Z are formed and connected in the same manner.

The U-shaped conductor segment forming the interphase connector 1000 has a slot-pitch different from that of the regular segments. That is, this special segment has a 7-slot pitch while a regular segment has a 6-slot pitch. In other words, if one of the in-slot conductors of this special segment is inserted into No.1 slot, the other in-slot conductor is inserted into No.8 slot. As to the regular segment, if one of the in-slot conductors is inserted into No.1 slot, the other in-slot conductor is inserted into No.7 slot. Similarly, a special segment forming the output terminal 2000 and the neutral point connector 3000 has a slot-pitch different from that of the regular segment. This special segment has a 5-slot pitch, i.e., if one of the in-slot conductors is inserted into No.1 slot, the other is inserted into No.6 slot. The segment forming the inter-phase connector 1000 and the segment forming the output terminal 2000 and the neutral point connector 3000 are referred to as special segments, while the other segments are referred to as regular segments. The slot-pitch of the respective segments will be explained later in further detail.

A process of twisting the head portions 331c, 332c of the segments for forming a required slot-pitch will be described with reference to FIGS. 6 and 7. Before performing this process, a preliminary twist (explained later) is given to the special segments, so that all the segments, inclusive of the regular segments and special segments, can be twisted together in this process to give respective final slot-pitches to all the segments.

Figure 6:
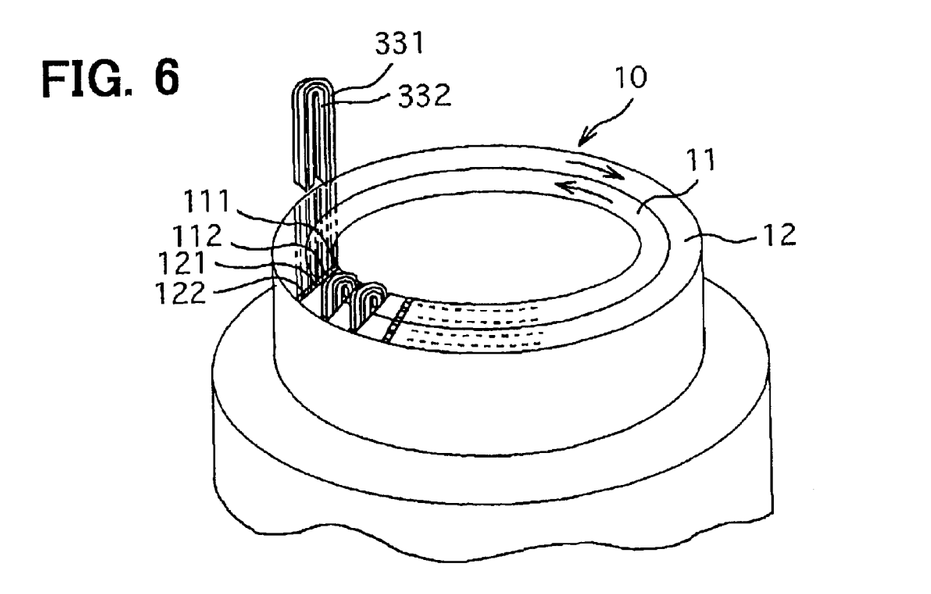
FIG. 6 is a perspective view showing an apparatus for twisting head portions of conductor segments.

As shown in FIG. 6, an apparatus 10 for twisting the head portion is composed of an outer ring 12 and an inner ring 11, both rings 12, 11 being coupled to each other to allow a relative rotation therebetween. Pairs of holes 121, 122 are formed in series in the outer ring 12 along its circumferential direction. An interval between neighboring pairs of holes 121, 122 is the same as an interval between neighboring slots 35 formed in the stator core 52. Similarly, pairs of holes 111, 112 are formed in series in the inner ring 11.

The inner ring 11 and the outer ring 12 are originally coupled so that four holes 111, 112, 121 and 122 are positioned in line in an radial direction of the rings. The legs of the large segment 331 are inserted into the outer most hole 122 and the inner most hole 111, respectively. The legs of the small segment 332 are inserted into holes 121 and 112, respectively. The special segments are inserted in a manner described later with reference to FIG. 10A.

Figure 7:
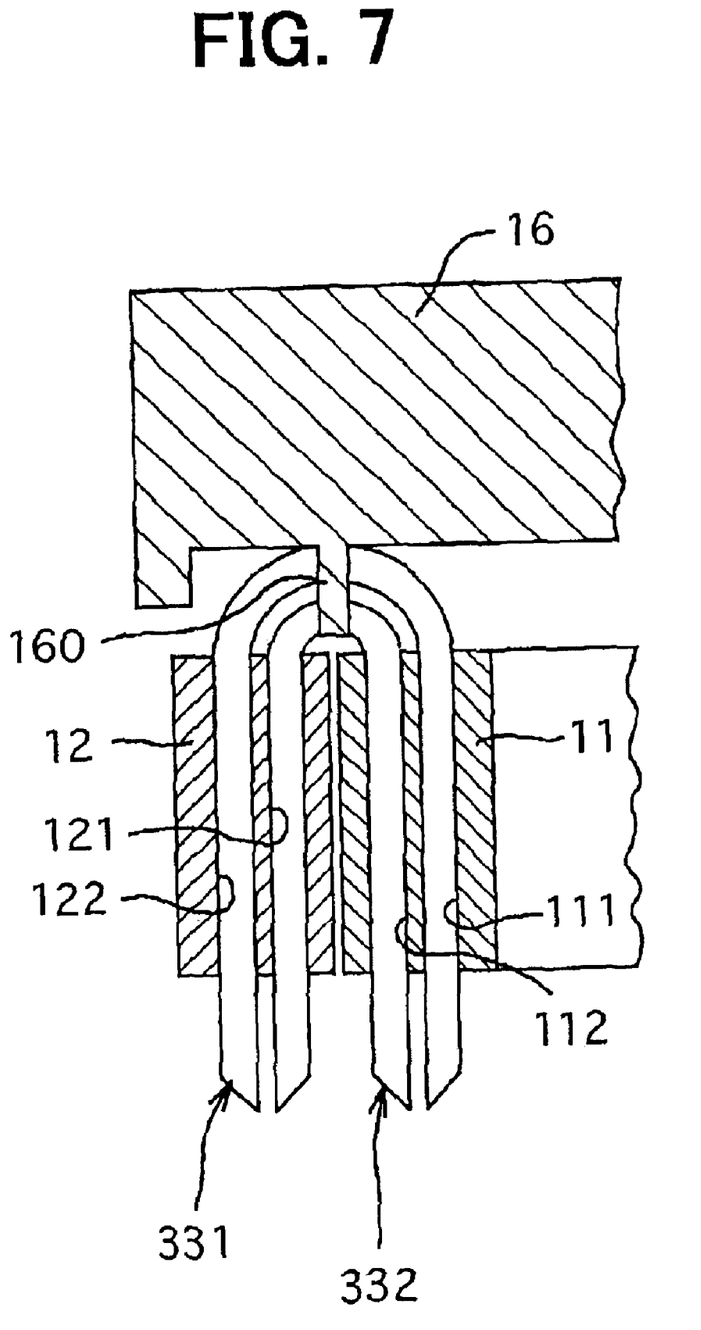
FIG. 7 is a partial cross-sectional view showing the apparatus shown in FIG. 6.

After all the segments are inserted into the rings 11, 12, the head portions of inserted segments are pushed by a head-pushing plate 16, as shown in FIG. 7. The head portions of each pair of the small segment 332 and the large segment 331 are held from their sides by claws 160 of the head-pushing plate 16. That is, the head portions are pushed down by the head-pushing plate 16 and held from both sides by the claws 160. Then, the inner ring 11 and the outer ring 12 are relatively rotated by a 6-slot pitch (corresponding to one pole pitch). In the course of the relative rotation, the head-pushing plate 16 is displaced in the axial direction to follow axial movement of the head portions due to their deformation. Thus, the U-shaped conductor segments 33 having a required slot-pitch are formed.

Then, all the segments 33 are removed from the rings 11, 12, while keeping the head-pushing plate 16 at its position to push the head portions. Then, all the segments 33 removed from the rings 11, 12 are inserted together into the respective slots 35 of the stator core 32, while keeping their relative positions unchanged. Thus, four in-slot conductors of the segments are positioned in each slot 35, as shown in FIG. 3. Then, the head-pushing plate 16 is separated from the head portions of the segments. Alternatively, the same head-pushing plate 16 may be used in the next process without separating it from the head portions.

Figure 8:
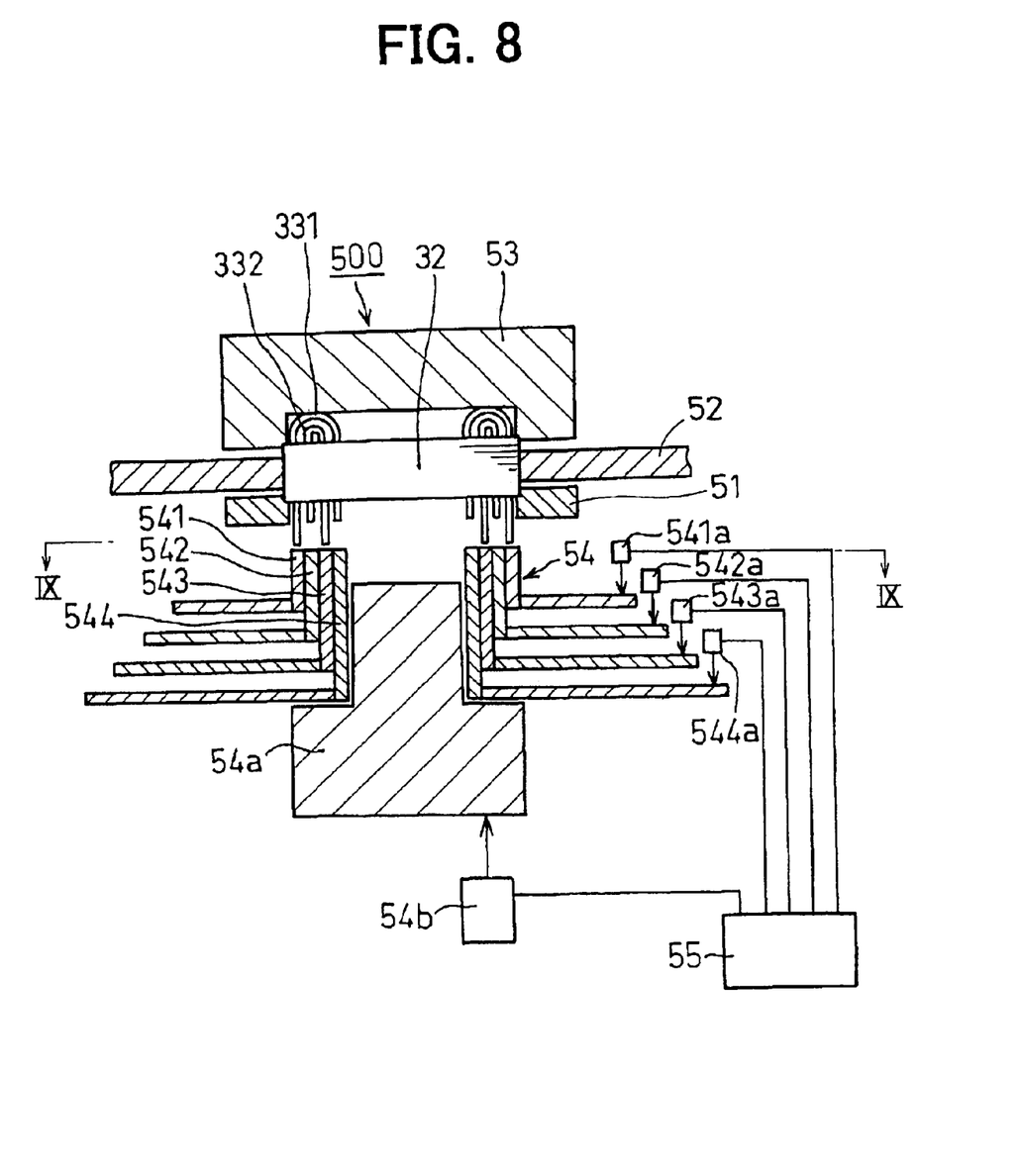
FIG. 8 is a cross-sectional view showing an apparatus for twisting leg-end portions of the U-shaped conductor segments.
Figure 9:
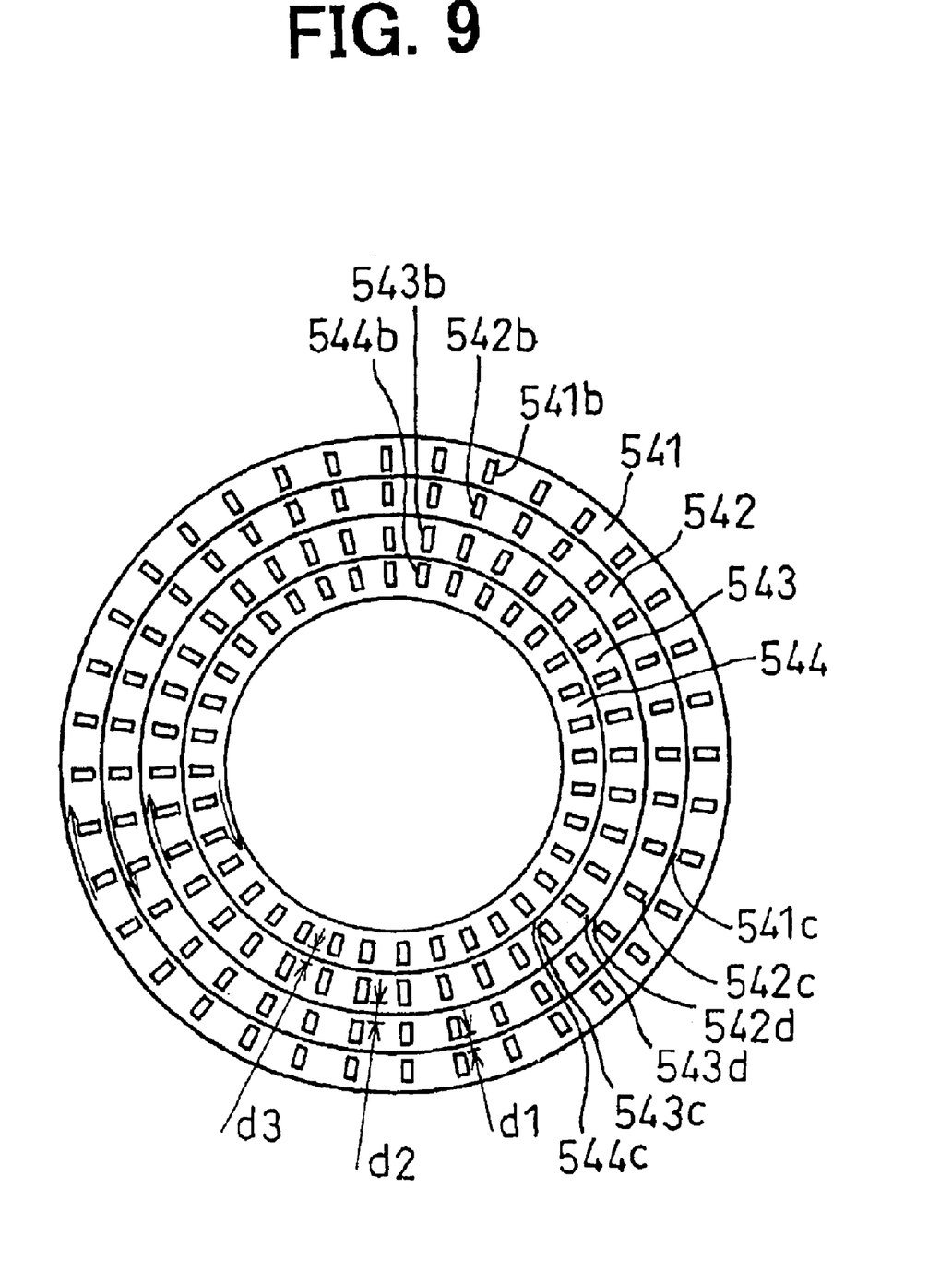
FIG. 9 is a plan view showing the twisting apparatus shown in FIG. 8, taken along line IX—IX of FIG. 8.

A process of twisting the leg-end portions of the segments 33 sticking out of the stator core 32 will be described with reference to FIGS. 8 and 9. FIG. 8 shows a leg-end twisting apparatus 500, and FIG. 9 shows a cross-sectional view of the apparatus shown in FIG. 8, taken along line IX—IX shown in FIG. 8. In this process, the leg-end portion 331g connected to the in-slot conductor 331b positioned at the first position in the slot 35 is twisted in one circumferential direction, while the leg-end portion 331f connected to the in-slot conductor 331a positioned at the fourth position in the slot 35 is twisted in the other circumferential direction. The total amount of twist given to both leg-end portions 331g and 331f is one pole-pitch, i.e., 6-slot pitch. The leg-end portion 332g connected to the in-slot conductor 332b positioned at the second position in the slot 35 is twisted in one circumferential direction, while the leg-end portion 332f connected to the in-slot conductor 332a positioned at the third position in the slot 35 is twisted in the other circumferential direction. The total amount of twist given to both leg-end portions 332g and 332f is one pole-pitch, i.e., 6-slot pitch.

The apparatus 500 for twisting the leg-end portions of the segments, shown in FIG. 8, is composed of the following components: a core supporter 51 for supporting the stator core 32 thereon; an outer clamper 52 for holding the outer periphery of the stator core 32; a head pusher plate 53 for pushing down the head portions of the segment; a leg-end twister 54 for twisting the leg-end portions of the segments; an elevating shaft 54a for driving the leg-end twister 54 in the axial direction; rotating drivers 541a–544a for driving the leg-twister 54 in the circumferential direction; a driver 54b for driving the elevating shaft 54a in the axial direction; and a controller 55 for controlling operation of the rotating drivers 541a–544a and the driver 54b. The legend twister 54 has four twisting rings 541–544 which are coaxially disposed and driven independently from one another. The twisting rings 541–544 are simultaneously driven in the axial direction.

As shown in FIG. 9, the twisting ring 541 has holes 541b for inserting leg-end portions 331g connected to the in-slot conductors 331b positioned at the first position in the slots 35. The holes 541b are circumferentially arranged with an equal interval. Similarly, the twisting ring 542 has holes 542b for inserting leg-end portions 332g connected to the in-slot conductors 332b positioned at the second position in the slots 35. The twisting ring 543 has holes 543b for inserting leg-end portions 332f connected to the in-slot conductors 332a positioned at the third position in the slots 35. The twisting ring 544 has holes 544b for inserting leg-end portions 331f connected to the in-slot conductors 331a positioned at the fourth position in the slots 35.

The holes 541b and holes 542b are radially distanced by the separating walls 541c and 542c, making a separating distance d1. The holes 542b and holes 543b are radially distanced by the separating walls 542d and 543d, making a separating distance d2. The holes 543b and holes 544b are distanced by the separating walls 543c and 544c, making a separating distance d3. In this arrangement, the separating distances d1 and d3 are made equal, while the separating distance d2 is made larger than d1 and d2.

The process of twisting the leg-end will be described. After all the segments 33 are inserted into the slots 35 of the stator core 32, the stator core 32 is set on the leg-twisting apparatus 500 shown in FIG. 8. The stator core 32 is placed on the core supporter 51, and the outer periphery of the stator core 32 is clamped by the outer damper 52. The head portions of the segments are pushed by the head pusher plate 53. Since the head portions 331c of the large segments 331 cover the head portions 332c of the small segment 332, the head pusher plate 53 pushes only the head portions of the large segments.

Then, the twisting rings 541–544 are elevated so that all the leg-ends of the segments are inserted into the respective inserting holes 541b–544b. Since a tip of each leg-end is tapered as shown in FIG. 7, each leg-end is easily inserted into the respective holes 541b–544b. Then, the legends are twisted by rotating the twisting rings 541–544 and driving the twisting rings 541–544 in the axial direction in the following manner.

The two twisting rings 541 and 543 are rotated clockwise by half a pole-pitch (three-slot pitch), while the other two twisting rings 542 and 544 are rotated counter-clockwise by half a pole-pitch (three-slot pitch). The leg-end twister 54 is elevated while rotating the twisting rings, so that a length of the leg-ends extending from the stator core 32 up to the upper surface of the twisting rings is kept at a predetermined length. In this process, the twisting rings 541–544 move up spirally, thereby over-twisting the leg-ends beyond half a pole-pitch. The over-twist is given to the leg-ends to compensate an amount of spring-back of the twisted leg-ends. Though the twisting rings 541–544 are over-elevated in this process, the segments do not slip out of the slots 35 because the leg-ends are already bent at the bottom surface of the stator core 32.

Then, the leg-end twister 54 is moved down while rotating the twisting rings 541–544 in directions opposite to the above-described directions, respectively. Thus, the leg-end twisting process is completed, and the stator core 32 having the twisted segments is dismounted from the leg-end twisting apparatus 500.

In the leg-end twisting process described above, the leg-ends of the segments are twisted by a required amount while keeping the leg-ends at a required length. Since the leg-ends are over-twisted to compensate the spring-back, a final amount of twist can be made to fall in a required range.

As described above, two neighboring twisting rings, i.e., the twisting rings 541 and 542, are rotated in directions opposite to each other. Therefore, the leg-ends inserted in the twisting ring 541 come close to the leg-ends inserted in the twisting ring 542. Similarly, the twisting ring 543 and 544 are rotated in directions opposite to each other, and the led-ends inserted in the twisting ring 543 come close to the leg-ends inserted in the twisting ring 544. Since those leg-ends coming close to each other are electrically connected at their respective connecting ends in the next connecting process, the connecting process can be easily performed. However, the leg-ends inserted in the twisting ring 542 and the leg-ends inserted in the twisting ring 543 are not electrically connected to each other. In order to prevent those leg-ends, which are not electrically connected, from coming close to each other in the leg-end twisting process, the separating distance d2 (shown in FIG. 9) is made larger than other separating distances d1 and d3. The next connecting process can be easily performed by making the separating distance d2 larger.

After the leg-end twisting process is completed, connecting ends are electrically connected to form an armature winding as a whole. As shown in FIG. 2, the connecting ends 332d and 331d', the connecting ends 332e and 331e', and the connecting ends 331d and 332d' are electrically connected to each other. Other connecting ends are similarly connected. In this connecting process, various methods, such as TIG-welding, soldering, resistance welding, electron beam welding or laser welding, may be used.

Now, referring to FIGS. 10A–14, a process for giving a preliminary twist to the special segments having a slot-pitch different from that of the regular segments will be described.

The inner ring 11 and the outer ring 12 used in this process have inserting grooves in place of the inserting holes 111–122. However, the grooves or the holes can be alternatively used as a matter of choice.

Figure 10A:
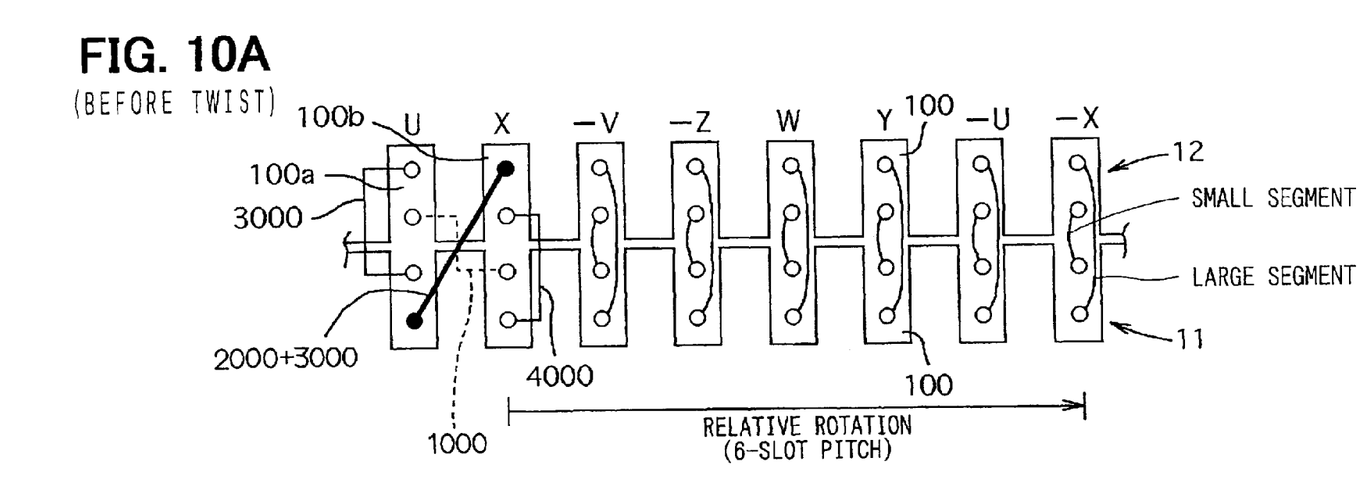
FIG. 10A is a schematic view showing the conductor segments inserted into slots of a stator core before a twisting process is performed.

Before describing the process for giving a preliminary twist, the reasons why such preliminary twist is required will be explained. FIG. 10A shows how the regular segments (the large segments and the small segments) and the special segments are inserted in the inner ring 11 and the outer ring 12 in the above-described process of twisting the head portions. One type of the special segments that forms the inter-phase connector 1000 (referred to as a special segment P) inserted into the inner and outer rings 11, 12 is shown with a dotted line, and another type of the special segments that forms the output terminal 2000 and the neutral point connector 3000 (referred to as a special segment T) is shown with a thick solid line. The special segment P is a small segment and the special segment T is a large segment.

As shown in FIG. 10A, the regular segments are all inserted into the grooves of the inner rings 11, 12, facing to each other, while the special segments P and T are inserted in the grooves which are shifted by one slot. Though only the special segments P, T in the U–X phase are shown in FIG. 10A, the special segments in other phases (V–Y and W–Z) are inserted in the same manner. Because the special segments P, T are inserted into the grooves shifted by one slot while the regular segments are inserted into the grooves facing each other, the special segments have to be preliminarily twisted by one slot in order to smoothly insert them into the grooves.

Figure 10B:
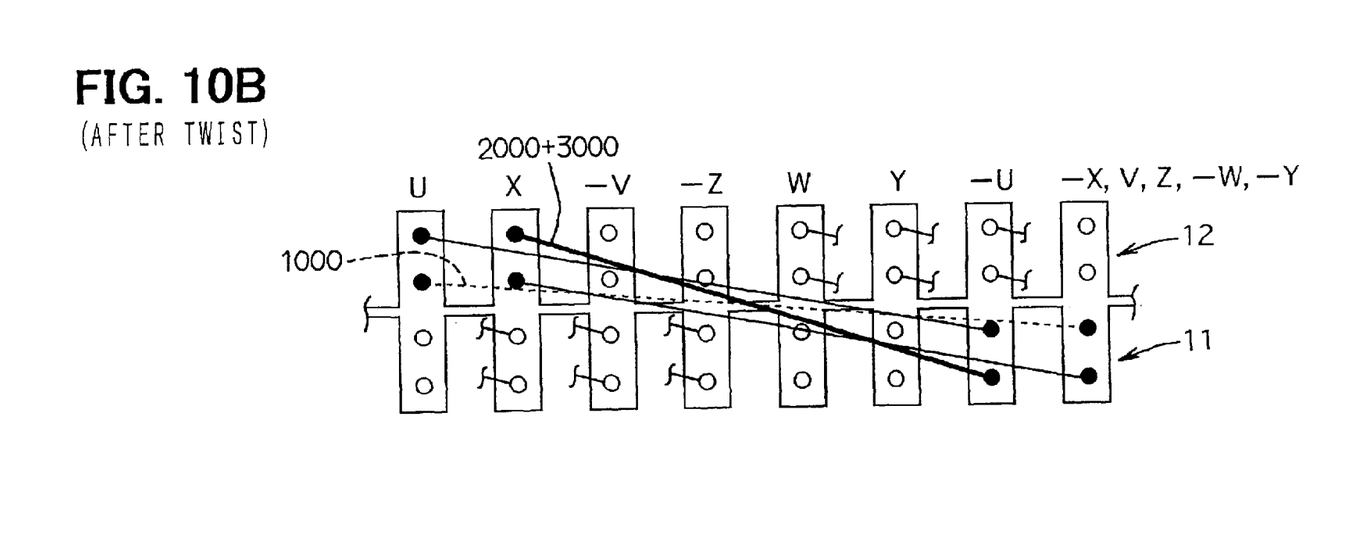
FIG. 10B is a schematic view showing the conductor segments inserted into slots of a stator core after the segments are twisted with respect to their head portions.

After all the segments including the regular segments and the special segments P, T are inserted into the grooves of the inner and the outer rings 11, 12, both rings are relatively rotated by one pole-pitch, i.e., a 6-slot pitch. FIG. 10B shows a situation after the rings 11, 12 are relatively rotated. All the segments are simultaneously twisted by 6-slot pitch. As a result, the special segment P forming the inter-phase connector 1000 has a 7-slot pitch, and the special segment T forming the output terminal 2000 and the neutral point connector 3000 has a 5-slot pitch. The regular segments have a 6-slot pitch.

Figure 11:
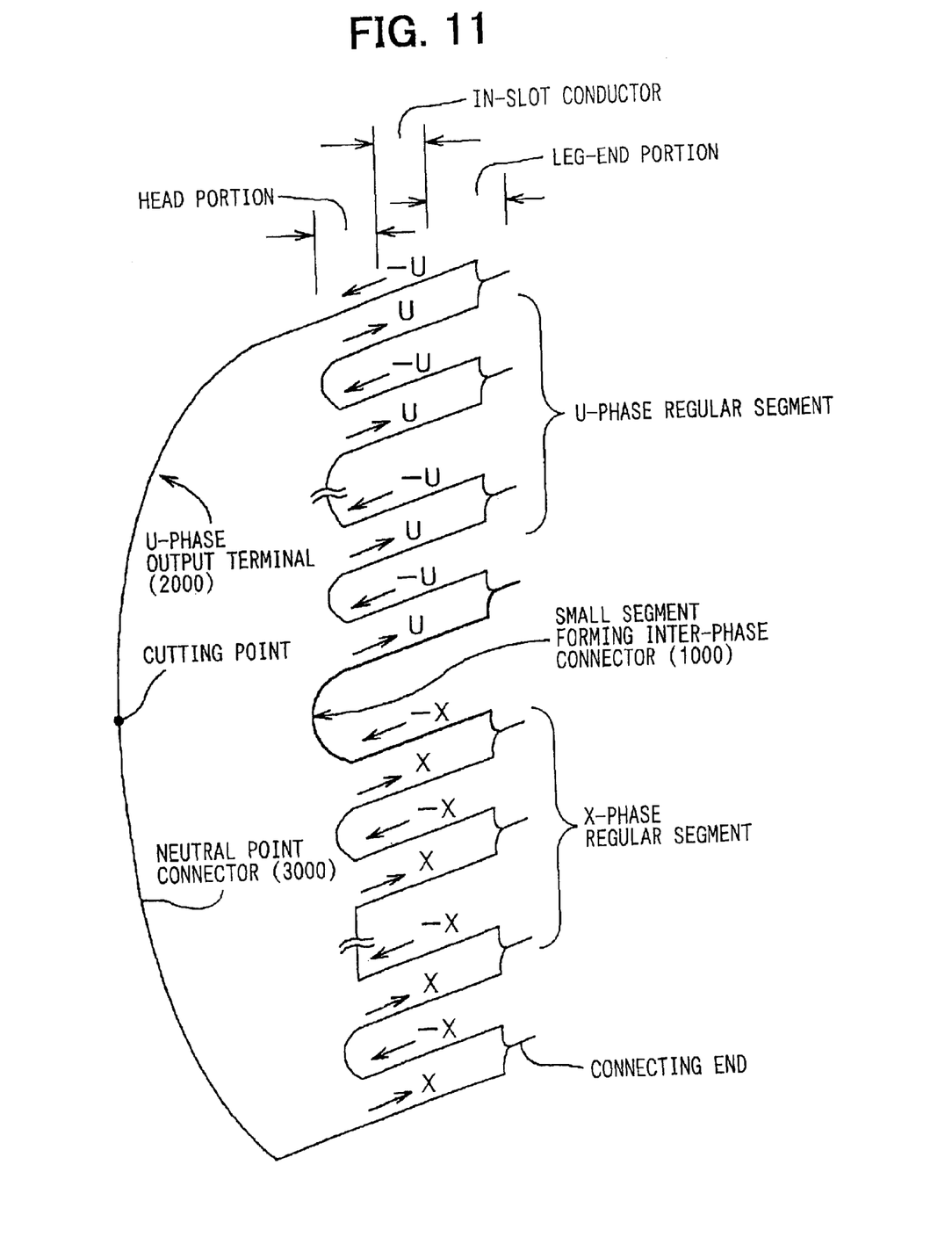
FIG. 11 is a drawing schematically showing electrical connections of the stator coil shown in FIG. 5.

After the head portions of the segments are twisted in the twisting apparatus, all the segments are taken out of the apparatus, keeping the relative position of the segments unchanged. Then, all the segments are simultaneously inserted into the slots 35 of the stator core 32, and the connecting ends of the segments are electrically connected to one another, forming the stator coil 31 as a whole. Electrical connections of the segments forming the U–X phase are shown in FIG. 11 in a spread form. The head portion 331c of the special segment T forming the U–X output terminal 2000 and the neutral point connector 3000 is cut out at a cutting point, as shown in FIG. 11.

Figure 12A:
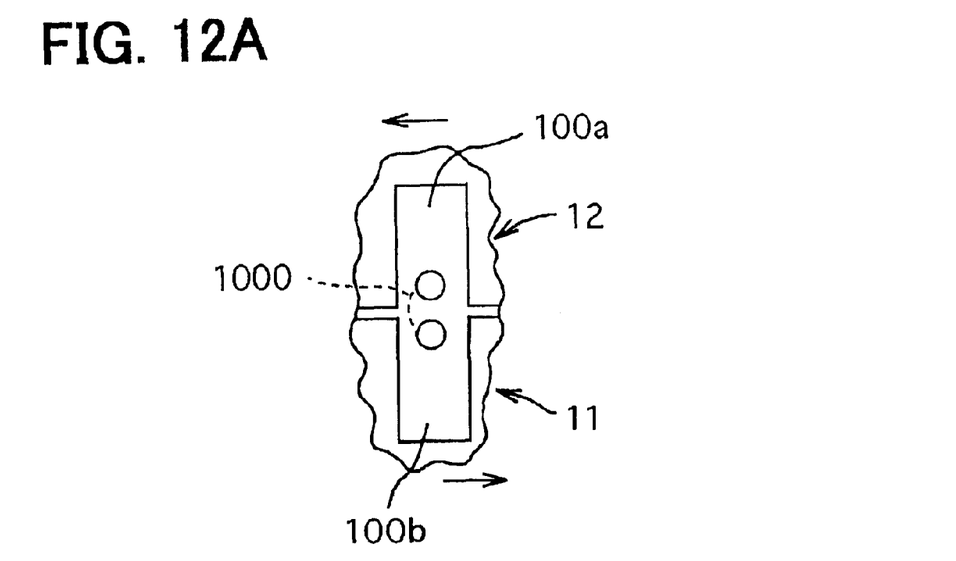
FIG. 12A is a plan view partially showing a twisting apparatus in which a small segment for forming an inter-phase connector is inserted.
Figure 12B:
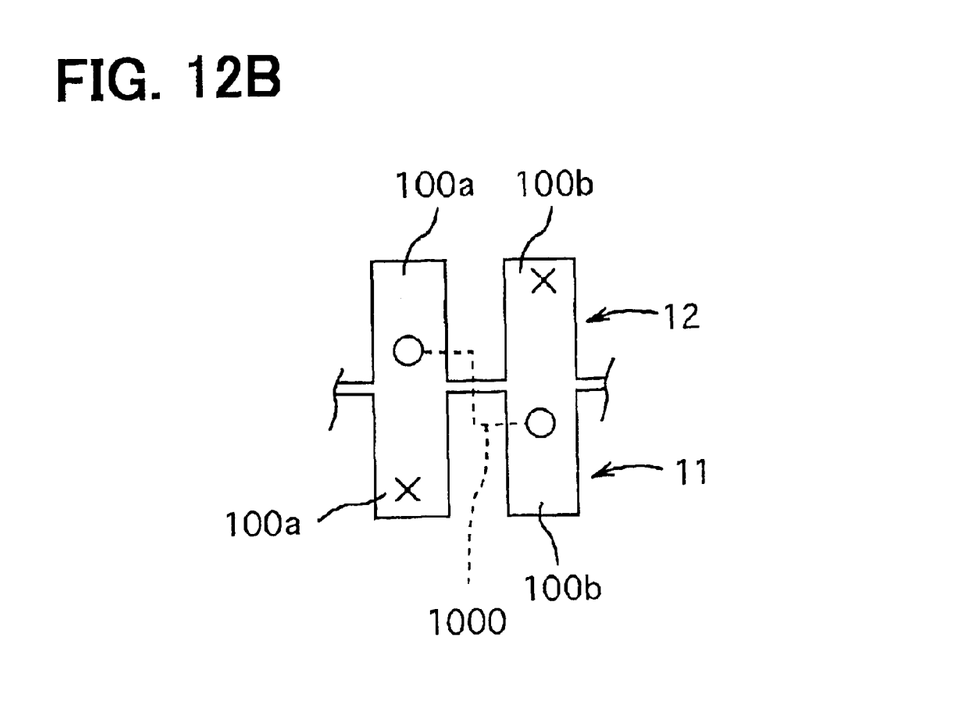
FIG. 12B is a plan view showing the same twisting apparatus as shown in FIG. 12A, the small segment inserted therein being preliminarily twisted.

Now, the process of preliminarily twisting the head portion 332c of the special segment P will be described with reference to FIGS. 12A, 12B and 13A, 13B. The same apparatus 10 shown in FIG. 6 may be used in this preliminarily twisting process. As shown in FIG. 12A, one leg of the special segment P forming the inter-phase connector 1000, which is not yet twisted, is inserted into a groove 100b of the inner ring 11, and the other leg is inserted into a groove 100a of the outer ring 12. Both sides of the head portion 332c are supported by the claws 160 (shown in FIG. 7). Then, the inner ring 11 and the outer ring 12 are relatively rotated by one slot pitch. The position of both rings 11, 12 after the relative rotation by one slot pitch is shown in FIG. 12B. The special segment T forming the output terminal 2000 and the neutral point connector 3000 is preliminarily twisted in the same manner as the special segment T. The special segment T, however, is preliminarily twisted by one slot pitch in a direction different form the special segment P.

Figure 13A:
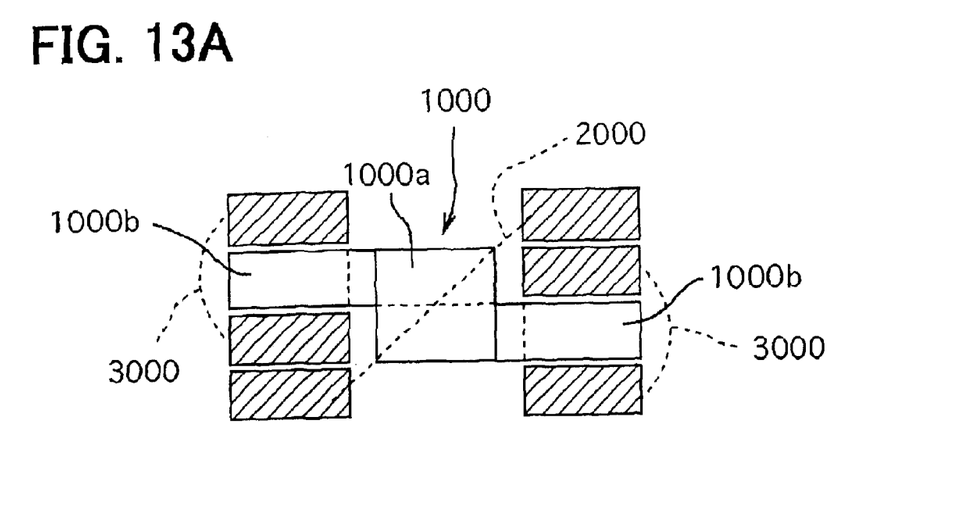
FIG. 13A is a top view schematically showing a preliminarily twisted head portion of the small segment forming the inter-phase connector.
Figure 13B:
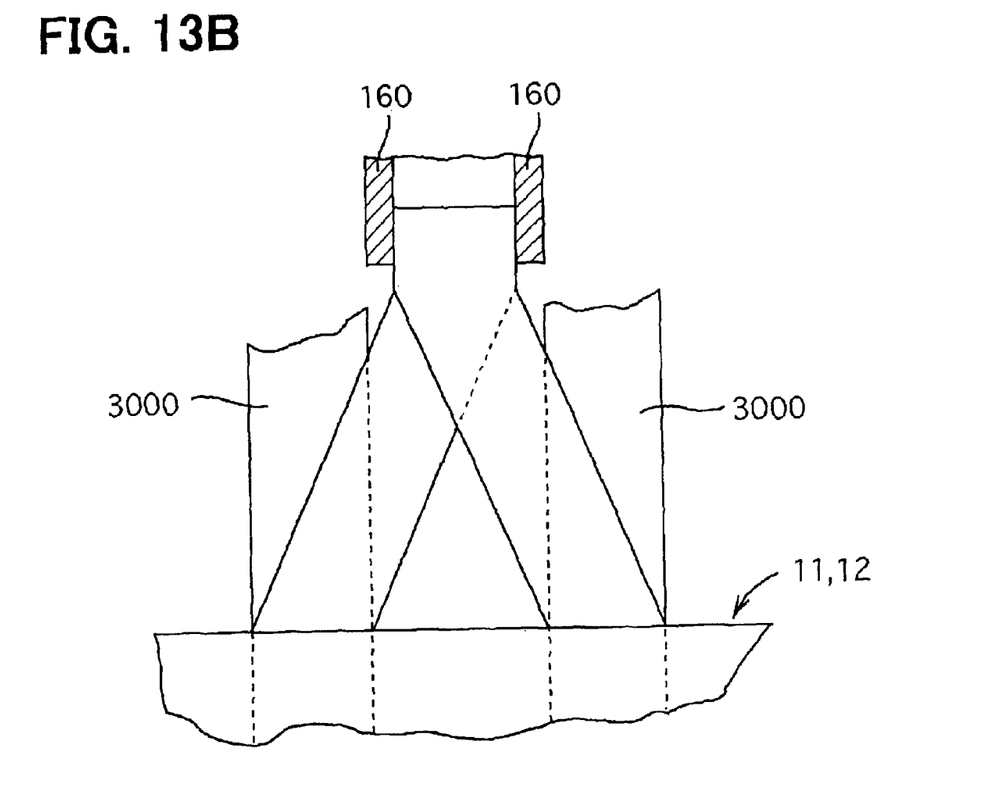
FIG. 13B is a side view schematically showing the same preliminarily twisted head portion shown in FIG. 13A.

FIG. 13A shows the special segment P forming the inter-phase connector 1000, viewed from its head portion after the special segment P is preliminarily twisted by one slot pitch in the twisting apparatus. The head portion is composed of a head top 1000a and a pair of slanted portions 1000b. In FIG. 13A, the preliminarily twisted special segment T forming the output terminal 2000 and the neutral point connector 3000, which are later inserted, is also shown for reference. FIG. 13B schematically shows a front view of the preliminarily twisted special segment P, the head top 1000a being clamped by the claws 160 from its both sides.

As described above, after the respective preliminary twists are given to the special segments P, T, they are all inserted into the twisting apparatus 10 together with other regular segments, as shown in FIG. 10A. Then, the inner ring 11 and the outer ring 12 are relatively rotated by the 6-slot pitch as shown in FIG. 10B, thereby simultaneously giving the 6-slot pitch to the regular segments, the 7-slot pitch to the special segments P and the 5-slot pitch to the special segments T.

Figure 14:
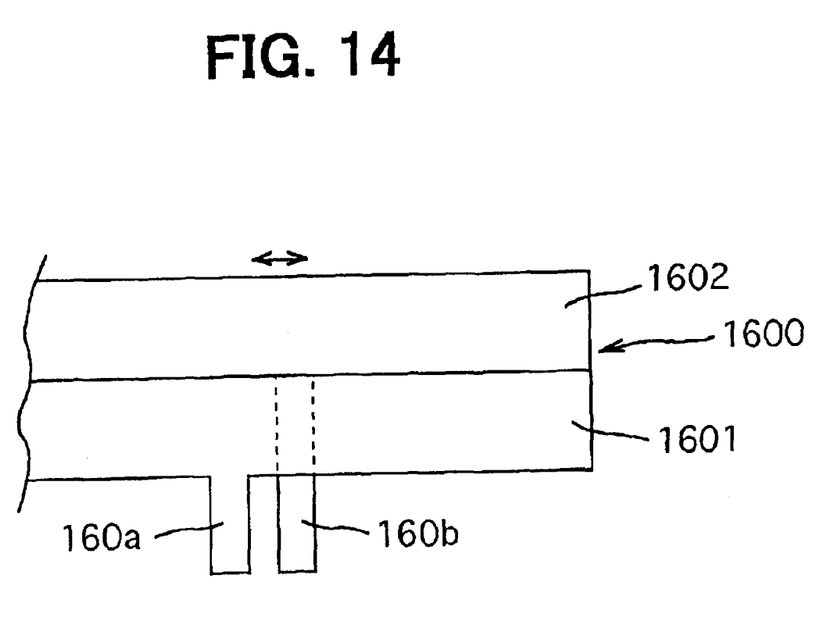
FIG. 14 is a side view showing a modified form of a head-pushing plate used in a process of preliminarily twisting the conductor segment.

The head-pushing plate 16 shown in FIG. 7 may be modified to a form shown in FIG. 14. The modified head-pushing plate 1600 is composed of a pair of rings 1601, 1602 which are disposed coaxially so that they are relatively rotatable in a limited angle. A claw 160a extends from the ring 1601, and another claw 160b extends from the ring 1602 through a loose through-hole (not shown) formed in the ring 1601. In the head twisting process, a space between the pair of claws 160a, 160b is opened, and the head-pushing plate 1600 is lowered to clamp the head portions of the segments from both sides thereof. Then, the space between the pair of claws 160a, 160b is tightened to firmly clamp the head portions by relatively rotating both rings 1601, 1602. In this manner, the head portion is steadily supported by the head-pushing plate 1600 during the process for twisting the head portions of the segments.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A method of manufacturing a stator coil of a rotary electric machine, the method comprising steps of:

forming a plurality of U-shaped conductor segments each having a head portion and a pair of legs connected to the head portion and extending in parallel to each other;

preparing an apparatus for twisting the head portions of the U-shaped conductor segments, the apparatus having an outer ring and an inner ring, both rings being coaxially coupled to allow a relative rotation therebetween, both rings including a plurality of holes or grooves for inserting the legs of the U-shaped conductor segments, the holes of the grooves being circumferentially arranged with an equal pitch therebetween;

inserting one leg of the pair of legs of the U-shaped conductor segment into the hole or the groove of the outer ring and the other leg into the hole or the groove of the inner ring, all the legs of the plurality of U-shaped conductor segments for forming the stator coil being inserted in the same manner; and causing a relative rotation between the outer ring and the inner ring by a predetermined rotational angle, thereby simultaneously twisting the all the head portions so that each pair of legs are positioned apart from each other by a predetermined first slot-pitch, wherein:

the plurality of the U-shaped conductor segments are composed of a group of regular segments and a group of special segments, one leg of the pair of legs of the regular segment being inserted into the hole or the groove of the outer ring and the other leg being inserted into hole or the groove of the inner ring that faces the hole or the groove of the outer ring, while one leg of the pair of legs of the special segment being inserted into the hole or the groove of the outer ring and the other leg being inserted into the hole or groove of the inner ring that is shifted from the hole or the groove of the outer ring by a predetermined second slot-pitch; and the head portion of each special segment is preliminarily twisted by the predetermined second slot-pitch before the legs of the special segment are inserted into the holes or the grooves of the outer and inner rings.

2. The method of manufacturing a stator coil as in claim 1, wherein:

the head portion of each special segment is preliminarily twisted in steps of:

inserting one leg of the special segment into the hole or the groove of the outer ring and the other leg into the hole or the groove of the inner ring that faces the hole or the groove of the outer ring; and causing a relative rotation between the outer ring and the inner ring by the predetermined second slot-pitch, thereby positioning the one leg apart from the other leg by the predetermined second slot-pitch.

* * * * *